United States Patent
Brouwer et al.

(10) Patent No.: US 7,374,299 B2
(45) Date of Patent: May 20, 2008

(54) HINGE ACTUATOR

(75) Inventors: Stefan Frits Brouwer, Schoonhoven (NL); Albertus van den Brink, Barneveld (NL); Peter Alexander Hamming, Steenwijk (NL); Marinus Roose, Nieuwegein (NL); Andreas Johannes Petrus Schalkwijk, Woerden (NL); Eric Gerardus Paulus van Slagmaat, Woerden (NL); Paulus Gerardus Maria van Stiphout, Woerden (NL)

(73) Assignee: MCi (Mirror Controls International) Netherlands B.V., Montfoort (NL)

( * ) Notice: Subject to any disclaimer, the term of this patent is extended or adjusted under 35 U.S.C. 154(b) by 0 days.

(21) Appl. No.: 11/500,089

(22) Filed: Aug. 7, 2006

(65) Prior Publication Data
US 2007/0035862 A1 Feb. 15, 2007

Related U.S. Application Data

(63) Continuation of application No. PCT/NL2005/000081, filed on Feb. 4, 2005.

(30) Foreign Application Priority Data

Feb. 6, 2004 (NL) ................................... 1025437

(51) Int. Cl.
G02B 7/18 (2006.01)
(52) U.S. Cl. ..................................... 359/841
(58) Field of Classification Search ................ 359/841, 359/872, 877
See application file for complete search history.

(56) References Cited

U.S. PATENT DOCUMENTS 6,022,113 A * 2/2000 Stolpe et al. ............... 359/841
7,070,287 B2 7/2006 Foote et al.

FOREIGN PATENT DOCUMENTS

| DE | 198 33 672 A1 | 5/1999 |
| EP | 1 129 906 A2 | 9/2001 |
| WO | WO 03/011642 A1 | 2/2003 |

OTHER PUBLICATIONS

International Preliminary Report on Patentability for Appl. No. PCT/NL2005/000081 mailed Aug. 7, 2006.
International Search Report for Appl. No. PCT/NL2005/000081 mailed May 19, 2005.

* cited by examiner

*Primary Examiner*—Euncha P. Cherry
(74) *Attorney, Agent, or Firm*—Dykema Gossett PLLC

(57) ABSTRACT

A hinge actuator for a wing mirror unit includes a base plate, including base shaft with mirror support; output part; coupling ring; and gear wheel. The base plate and mirror support include cooperating stops. The coupling ring is arranged so as to be rotatable with limited travel about the base of the shaft between a first angle $\alpha 1$, which corresponds to a folded-out position, and a second angle $\alpha 2$. The coupling ring can cooperate with the mirror support via a first set of cooperating stops, and can cooperate with the base plate via a second set of cooperating stops, such that in the first angle $\alpha 1$ of the coupling ring, the spring force is transmitted, through cooperation of the first set of stops, and that in the second angle $\alpha 2$, the spring force, through cooperation of the second set of stops, is transmitted to the base plate.

20 Claims, 7 Drawing Sheets

HINGE ACTUATOR

CROSS-REFERENCE TO RELATED APPLICATION

This application is a continuation of International PCT Application No. PCT/NL2005/000081, with an international filing date of Feb. 4, 2005, which claims the benefit of priority to Netherlands Application No. 1025437, filed Feb. 6, 2004, each of which applications are fully incorporated herein by reference.

TECHNICAL FIELD

The invention relates to a hinge actuator, including a hinge actuator for a wing mirror unit.

BACKGROUND

Hinge actuators for wing mirror units are generally known and are typically attached by a base plate to a door of a motor vehicle. A mirror support, also referred to as mirror supporting frame, typically comprises a mirror housing that accommodates a mirror glass. The mirror support, in particular the mirror housing, can then pivot relative to the base plate between a folded-in position, in which the width of the vehicle, for instance for the purpose of parking, is reduced, and a folded-out position for use of the wing mirror unit under normal operating conditions. In the folded-in position, the mirror support extends in a substantially rearward orientation along the longitudinal axis of the bodywork of the vehicle. In the folded-out position, the mirror support extends substantially transversely to the longitudinal axis of the bodywork.

SUMMARY

A hinge actuator for a wing mirror unit may comprise a base plate for mounting on a motor vehicle, which base plate is provided with a base shaft having a mirror support pivotably arranged around it, wherein base plate and mirror support are provided with cooperating stops for defining a folded-out position of the mirror support relative to the base plate. Such a hinge actuator may further comprise a gear wheel arranged around the base shaft so as to be rotatable and axially movable under spring action, which gear wheel cooperates with an output part of a drive arranged on the mirror support, and which gear wheel further cooperates via coupling elements with a coupling ring which is likewise arranged around the base shaft so as to be axially movable under the action of the spring.

A folded-out position can be defined in that the stops cooperate upon outward pivoting movement from the folded-in position to the folded-out position, so that further pivoting is obstructed. Upon an overloading in the outward pivoting direction, the cooperating stops can typically be overcome, so that the mirror housing can pivot beyond the folded-out position to an overfold position.

The mirror support can be pivoted both electrically and non-electrically, for instance manually, relative to the base plate. By the use of the coupling between gear wheel and coupling ring, the electric drive can be uncoupled, so that a pivotal motion of the mirror support not caused by the drive, for instance an inward pivoting motion resulting from impact forces, does not force any movements of the drive, and damage to the electric drive, such as fractures in a drive train or defects in an electric motor, can be avoided.

It is desired to define the folded-out position of the mirror support so well that unintended pivoting back is prevented. This reduces the influence of external forces exerted on the mirror housing, for instance by driving wind flowing along the mirror housing. In practice, the folded-out position is typically defined in that the stops are under spring action and cooperate with high friction.

In order to enable electric inward pivoting from the folded-out position, however, the force caused by cooperation of the stops should preferably not exceed a select or predetermined level, since the drive must produce a driving moment that must be able to overcome the reaction force.

This problem can be mitigated through the provision of an additional pair of stops which, from the select or predetermined position, cooperate in the inward pivoting direction. However, the force needed during inward pivoting towards the folded-in position to overcome the additional stops should not be unduly large either, since the drive must also be able, during electric inward pivoting, to produce a driving moment that can overcome the additional stops.

It has been found desirable, however, that the mirror housing, upon manual adjustment, be secured in the folded-out position in such a way that a clearly sensible coupling or 'click' can be felt. Preferably, the force that is needed to pivot the mirror housing inwards from the folded-out position to the folded-in position is of the same order of magnitude as the required force for outward pivoting from the folded-out position to the overfold position.

To realize this, the force needed for overcoming both the stops and the additional stops should be of the same order of magnitude. However, the electric drive then cannot adjust the mirror housing from the folded-out position to the folded-in position, unless unacceptably powerful and costly electric motors are used, or the force needed for overcoming the additional stops is so slight that upon manual inward pivoting from the folded-out position no resistance of significance is sensed.

An object of the invention is to provide a hinge actuator for a wing mirror of the type mentioned in the opening paragraph hereof, by which the folded-out position can be defined well, while yet a relatively light drive can suffice. In particular, embodiments of the invention contemplate such a hinge actuator in which the folded-out position in the case of manual adjustment may likewise be well defined.

A hinge actuator according to an embodiment of the invention may be characterized in that the coupling ring may be arranged so as to be rotatable with limited travel about the base shaft between a first angle $\alpha 1$ corresponding to the folded-out position and a second angle $\alpha 2$, and that the coupling ring furthermore can cooperate with the mirror support via a first set of cooperating stops, and can cooperate with the base plate via a second set of cooperating stops, such that in the first angle $\alpha 1$ of the coupling ring, the spring force is transmitted, through cooperation of the first set of stops, via the mirror support to the base plate, and that in the second angular position $\alpha 2$ of the coupling ring, the spring force, through cooperation of the second set of stops while leaving the mirror support clear, is transmitted to the base plate.

Through the use of the coupling ring rotatable with limited travel, the stops between mirror support and base plate can cooperate in the folded-out position under relatively large spring force and define the folded-out position well, while yet the drive can be made of light design.

Further advantageous embodiments of the invention are set forth in and/or embodied by the claims.

Aspects of the invention will now be further elucidated with reference to exemplary embodiments which are represented in the drawings. In the drawings.

The figures only concern preferred embodiments of the invention and are provided as non-limiting exemplary embodiments. In the figures, the same or corresponding parts are indicated with the same reference numerals.

Figure 1:
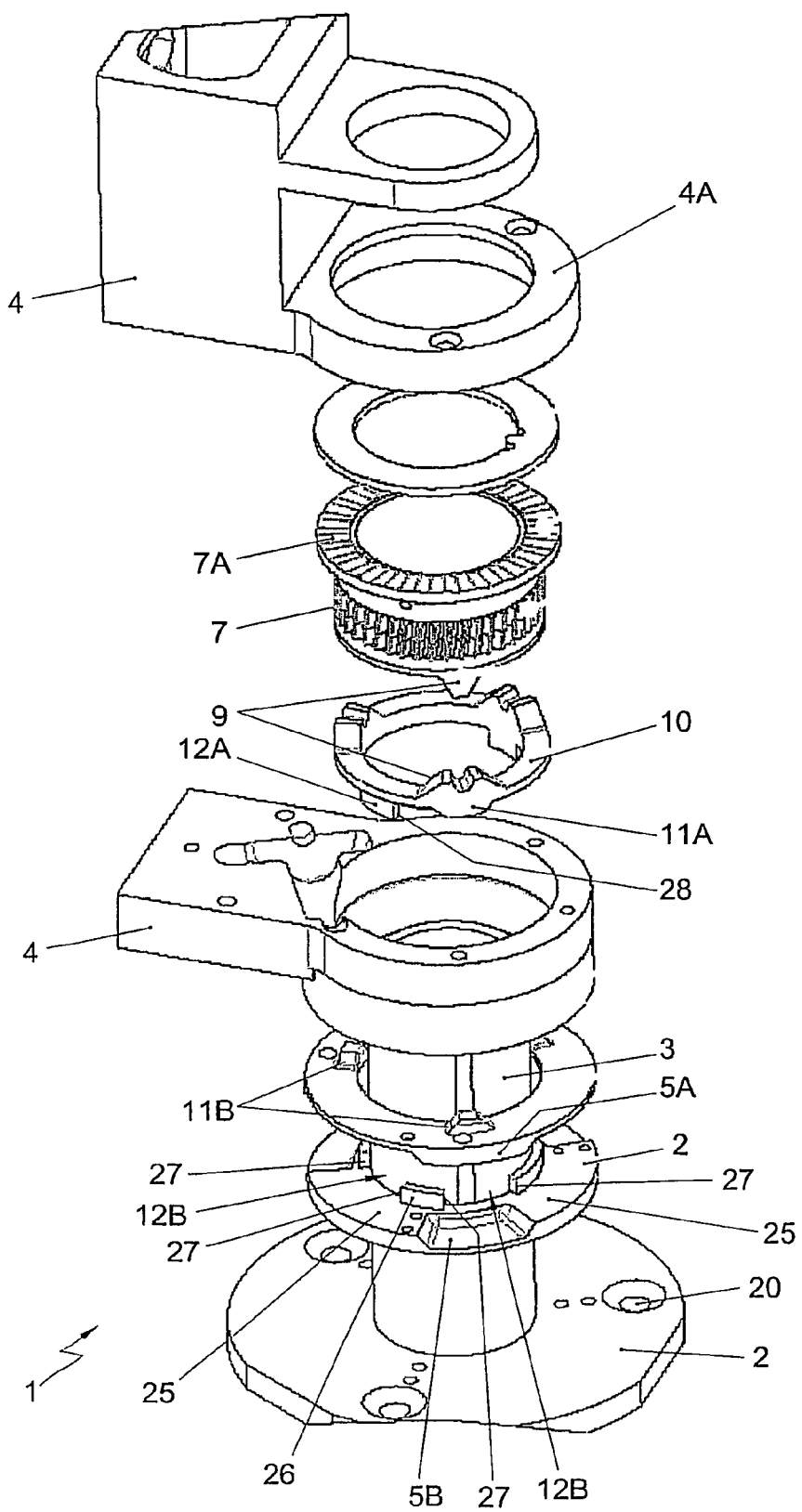
FIG. 1 shows a schematic perspective view of a hinge actuator in a folded-out position according to an embodiment of the invention in disassembled condition and viewed from above.

The figures show a hinge actuator 1 for a wing mirror unit. The hinge actuator 1 comprises a base plate 2 for mounting on a motor vehicle, for instance by mounting the base plate 2 via screw holes 20 onto the door of a motor vehicle. The base plate is provided with a base shaft 3 whose orientation during use is substantially upstanding. A mirror support 4 is pivotably arranged around the base shaft 3, so that the geometric longitudinal axis of the base shaft 3 forms the axis of rotation.

The mirror support 4 is usually coupled to a mirror cap, not shown in the drawing, which surrounds a mirror supporting plate likewise coupled to the mirror support, on which a mirror glass is mounted. Usually, between the support 4 and mirror supporting plate, a mirror adjustment mechanism is arranged with which the mirror glass can be pivoted relative to the mirror support about a substantially upstanding and/or horizontal pivoting axis.

Figure 2:
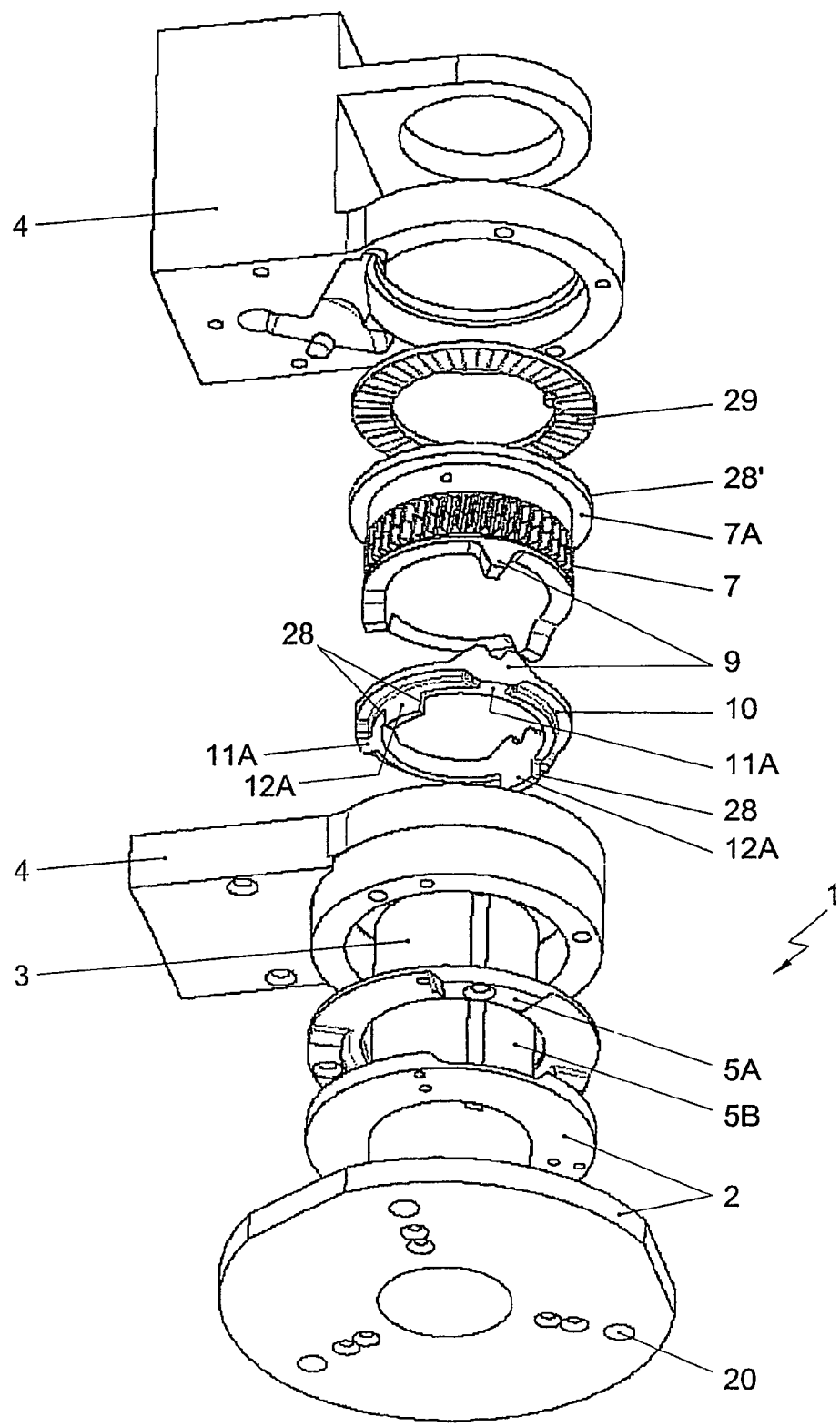
FIG. 2 shows a schematic perspective view of the hinge actuator of FIG. 1, viewed from below.

It is noted that in FIGS. 1 and 2, for practical reasons, the base plate 2 and the mirror support 4 are represented as being built up from loose parts.

It will be clear that the loose parts of both the base plate 2 and mirror support 4 can each be designed as a single part.

Figure 5A:
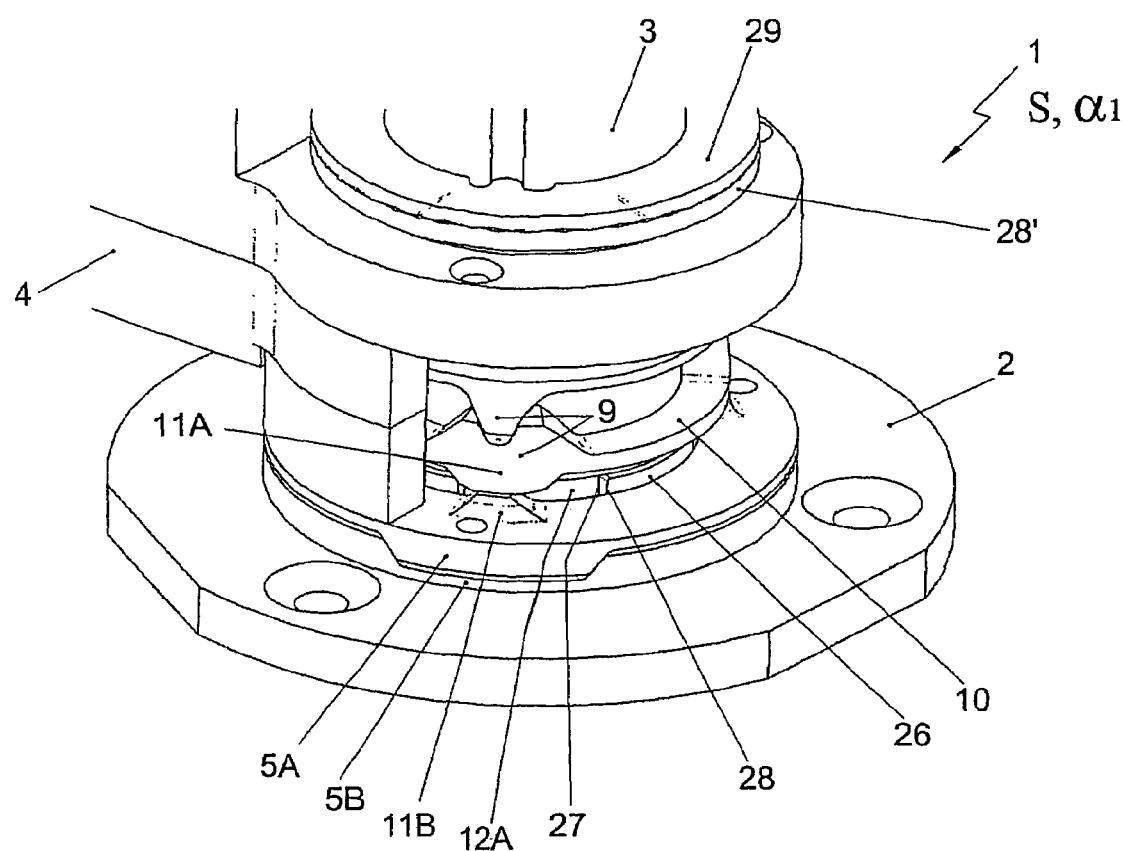
FIG. 5A shows a schematic perspective view of the hinge actuator in assembled condition in the folded-out position S with the coupling ring in the first angular position.

The base plate 2 and the mirror support 4 are provided with cooperating stops 5a, 5b for defining a folded-out position S of the mirror support relative to the base plate 2 (FIG. 5A). During use, in the folded-out position, the mirror support 4 usually extends transversely to the longitudinal axis of the motor vehicle. The cooperating stops 5a, 5b in this exemplary embodiment are designed as three cams 5a on the mirror support 4 which, in the folded-out position, are received in corresponding recesses 5b in the base plate 2. The cams and recesses ensure a clearly defined folded-out position S.

The cams 5a and the recesses 5b are provided with a flat running surface which is flanked by inclined sides, so that the mirror support 4 can be pivoted from the folded-out position to a position in which the cams 5a cooperate with cam tracks 25 contiguous to the recesses. From the folded-out position S, the mirror support can pivot to a folded-in position in which the mirror support is disposed in substantially rearward orientation along the bodywork of the motor vehicle. Furthermore, it is possible to pivot the mirror support 4 from the folded-out position S to an overfold position in which the mirror support is disposed in substantially forwardly directed orientation along the bodywork of the motor vehicle.

The cooperating stops 5a, 5b therefore form a stop which defines the folded-out position S for the drive both in fold-in direction and in fold-out/overfold direction.

As will be further elucidated hereinafter, the cooperating stops 5a, 5b in the folded-out position S are under spring action in that the mirror support 4 is pressed onto the base plate 2 by means of a spiral spring 6 (not shown) arranged around the base shaft 3.

The hinge actuator 1 furthermore comprises a gear wheel 7 which is likewise under the action of the spring 6, which gear wheel 7 is axially movably and rotatably arranged around the base shaft 3. The gear wheel 7 cooperates with an output part 8 of a drive (not shown) arranged on the mirror support 4. The drive may for instance be formed by an electric motor which at its output shaft is provided with a worm which cooperates through a right-angle transmission with a worm wheel. The worm wheel in turn may be provided with a rotation shaft on which a second worm is provided which cooperates with the teeth on the periphery of the gear wheel 7. In such a case, the second worm forms the output part of the drive.

The gear wheel 7 furthermore cooperates via coupling elements 9 with a coupling ring 10 which is likewise arranged around the base shaft 3 so as to be axially movable under the action of spring 6.

The coupling ring 10 is furthermore arranged so as to be rotatable with a limited travel about the base shaft 3. The coupling ring 10 is pivotable through an angle of preferably about 10°-15° between a first angle $\alpha 1$ corresponding to the folded-out position S and a second angle $\alpha 2$.

Figure 4:
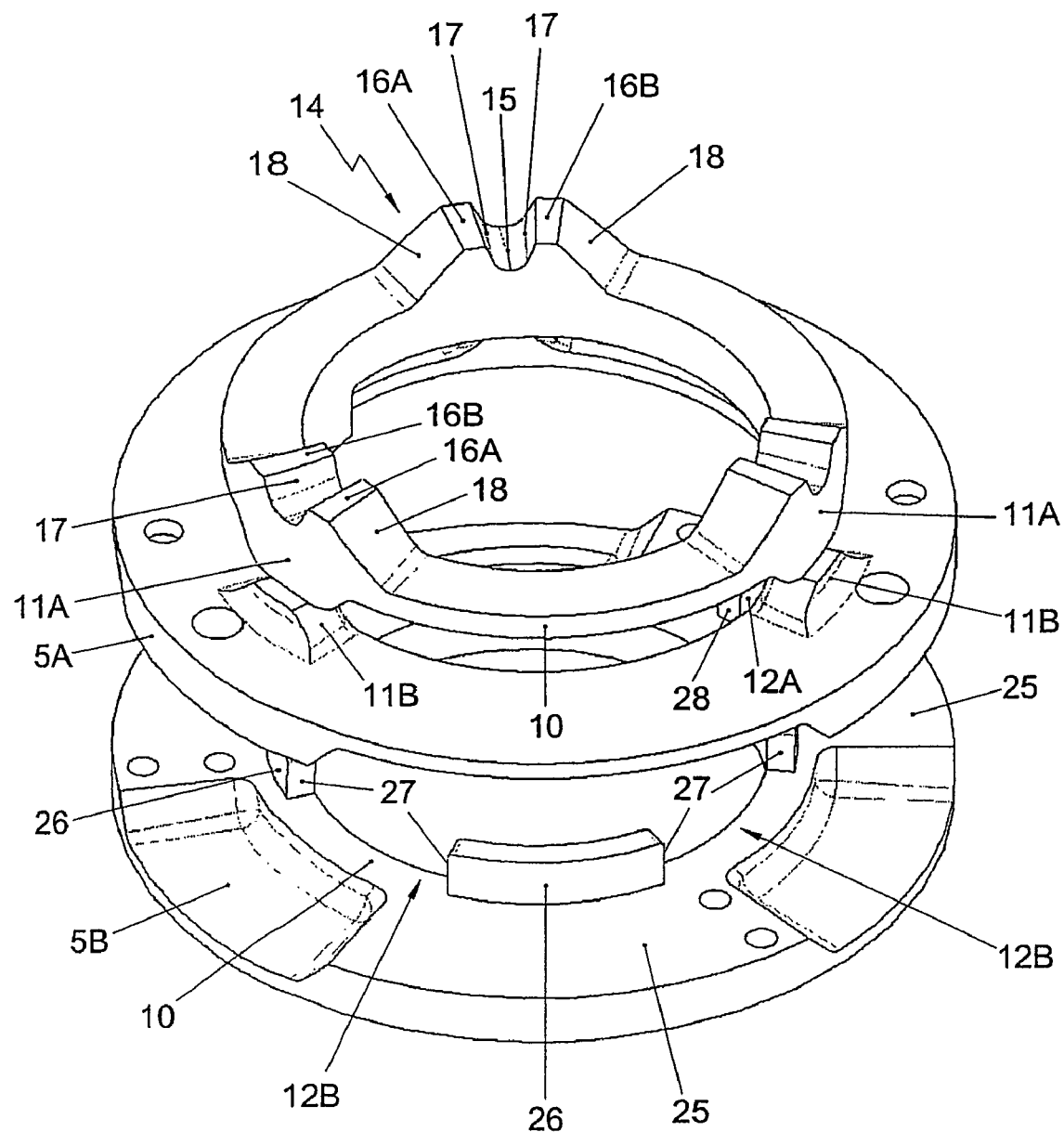
FIG. 4 shows a detail of the hinge actuator of FIG. 1 in which a coupling ring and a mirror support are shown which cooperate via the first coupling means in the first angular position $\alpha 1$.

The coupling ring 10 can cooperate with the mirror support via a first set of stops 11a, 11b, and can cooperate with the base plate 3 via a second set of stops 12a, 12b. The first set of stops 11a, 11b in this example, as is properly visible in FIG. 4, is formed by three downwardly reaching cams 11a which are regularly spaced along a more outwardly situated part of the bottom surface of the coupling ring while including an angle of about 120°.

The first set of stops 11a, 11b further comprises three corresponding upwardly reaching stops 11b on the mirror support 4.

The second set of stops 12a, 12b comprises three further cams 12a which are arranged on a more inwardly situated part of the bottom surface of the coupling ring 10 and whose contact surfaces are situated nearer to the base plate 2 than the contact surfaces of the cams 11a of the first set. The second set of cams furthermore comprises three correspondingly shaped recesses 12b which are formed in a collar 26 on the base plate 2. The cams 12a of the second set reach through a ring-shaped opening in the mirror support 4 into the recesses 12b provided in the collar 26. The end faces 27 of the recesses 12b of the second set then cooperate with side surfaces 28 of the cams 12a of the second set of stops to limit the rotational travel of the coupling ring 10 relative to the base shaft 3.

Figure 5B:
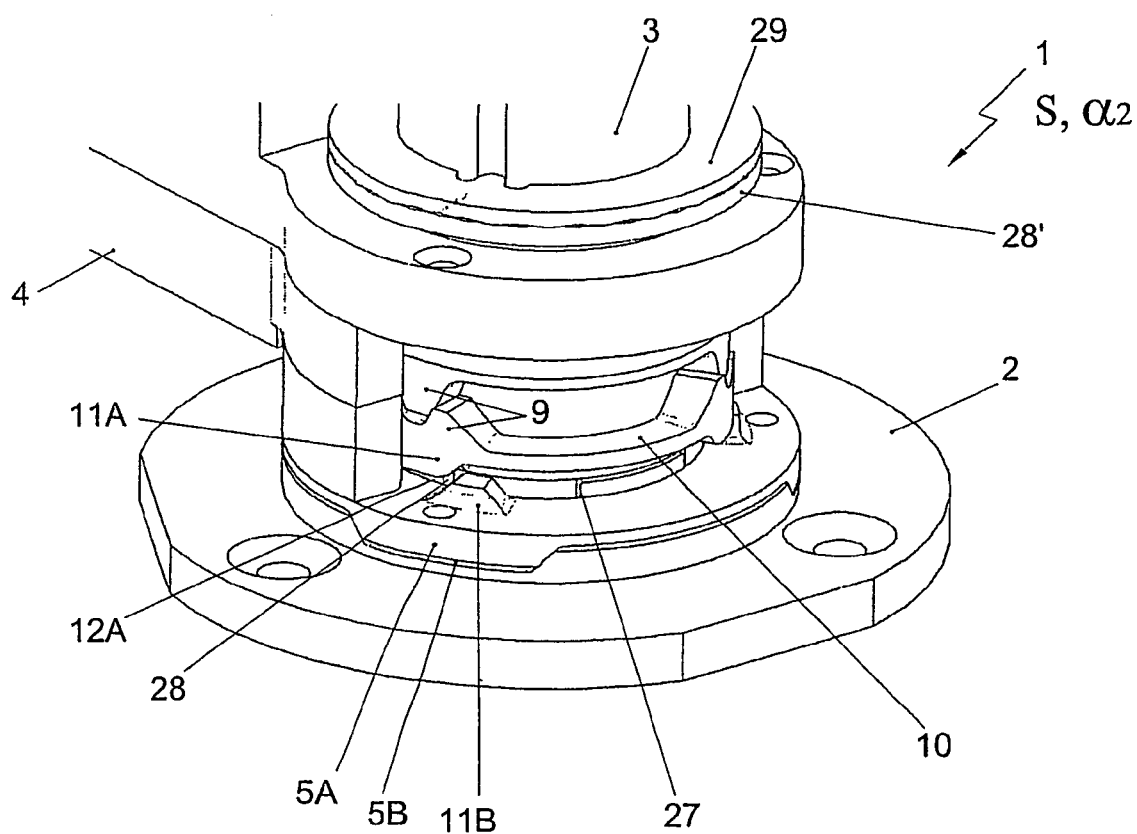
FIG. 5B shows the hinge actuator of FIG. 5A with the coupling ring in the second angular position.

In FIG. 5A it is shown that in the first angular position $\alpha 1$ of the coupling ring 10, the spring force of the spring 6 is transmitted, through cooperation of the cams 11a and 11b of the first set of stops 11a, 11b, via the mirror support 4 to the base plate 2. In FIG. 5B it is shown that in the second angular position α2 of the coupling ring 10, the spring force of the spring 6 is transmitted directly to the base plate through cooperation of the cams 12a with the base surface of the recesses 12b of the second set of cams, while leaving clear the mirror support 4. In the second angular position α2, the mirror support 4 is therefore not subject to the action of spring 6.

Figure 5C:
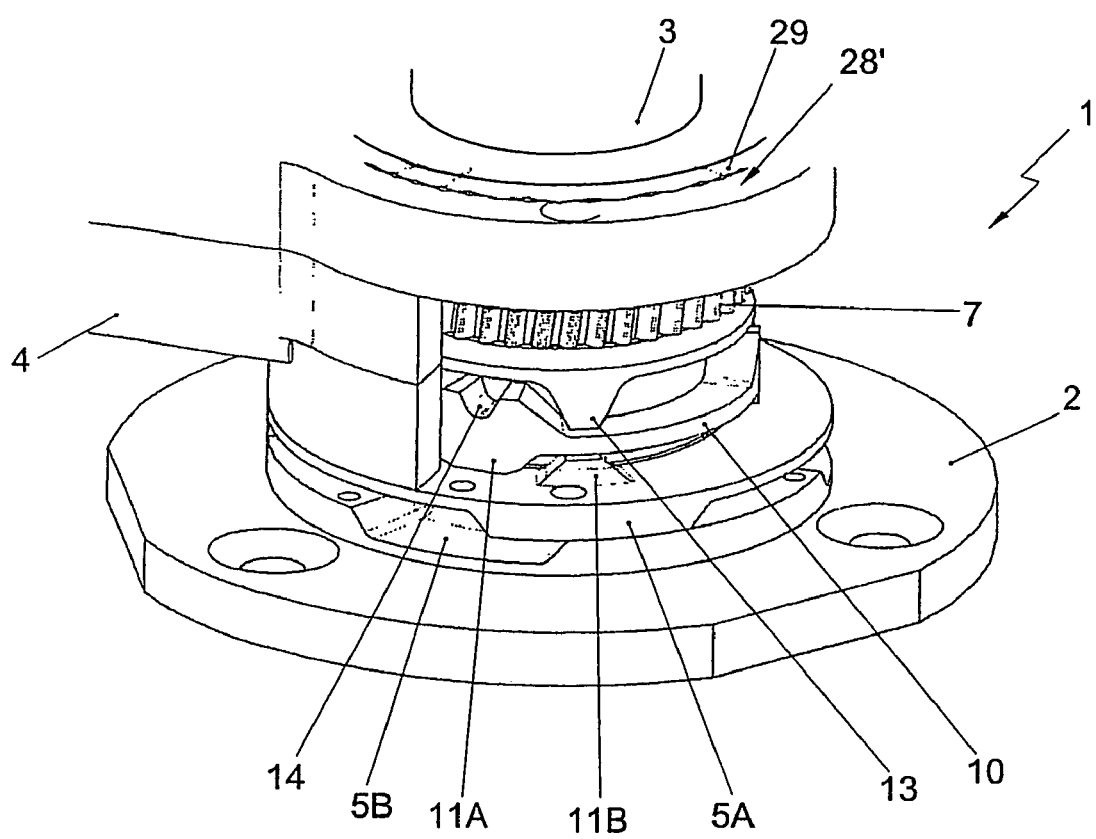
FIG. 5C shows the hinge actuator of FIG. 5A, during a non-driven pivotal motion, with the gear wheel uncoupled from the coupling ring.

Referring to FIGS. 5A-5C, the operation of the hinge actuator 1 will be elucidated in the following.

When pivoting back from the folded-out position (FIG. 5A) to the folded-in position, the drive will first pivot the coupling ring 10 from the first angular position α1, in which the first cams 11a, 11b cooperate, to the second angular position α2 (FIG. 5B), in which the second cams 12a, 12b cooperate. In the second angular position α2 (FIG. 5B), the support 4 is not under spring action anymore and the coupling ring 10 is at the end of its limited travel. It will now be relatively easy to pivot the mirror support 4 relative to the base shaft 3 under the influence of the drive 8 engaging the gear wheel 7. In the first angular position α1 of the coupling ring 10, the gear wheel 7 is further removed, in axial direction along the base shaft 3, from the base plate 2 than in the second angular position α2.

In an elegant manner, therefore, in the first angular position α1 the spring action on the coupling ring is greater than in the second angular position α2. What is thus achieved is that upon pivoting from the folded-out position S, the motor does not need to compress the spring 6 and therefore does not need to work against the force of the spring.

Whilst pivoting outwards from the folded-in position to the folded-out position S under the influence of the drive, then, as soon as the stops 5a, 5b start to cooperate, the coupling ring 10 will pivot under the influence of the drive from the second angular position α2 (FIG. 5B) to the first angular position α1 (FIG. 5A). Just before reaching the first angular position α1, through cooperation of the first set of cams 11a, 11b, the mirror support 4 will come under spring action, so that the cooperating stops are put under spring action. Upon exceeding a select or predetermined cooperation force, the motor can be switched off, for instance with the aid of a current limiting circuit known to the skilled person.

In an embodiment, the driving moment needed for overcoming the cooperation of the first cams 11a, 11b may be chosen to be less than the driving moment needed for overcoming the cooperating stops 5a, 5b from the folded-out position S.

In case of a pivotal motion of the mirror support relative to the base plate that has not been caused by the drive, the coupling elements 9 between gear wheel and coupling ring will be uncoupled (FIG. 5C). As a result, upon pivoting of the mirror support 4 about the base shaft 3, the gear wheel 7 can be carried along by the output part 8 of the drive.

Figure 3:
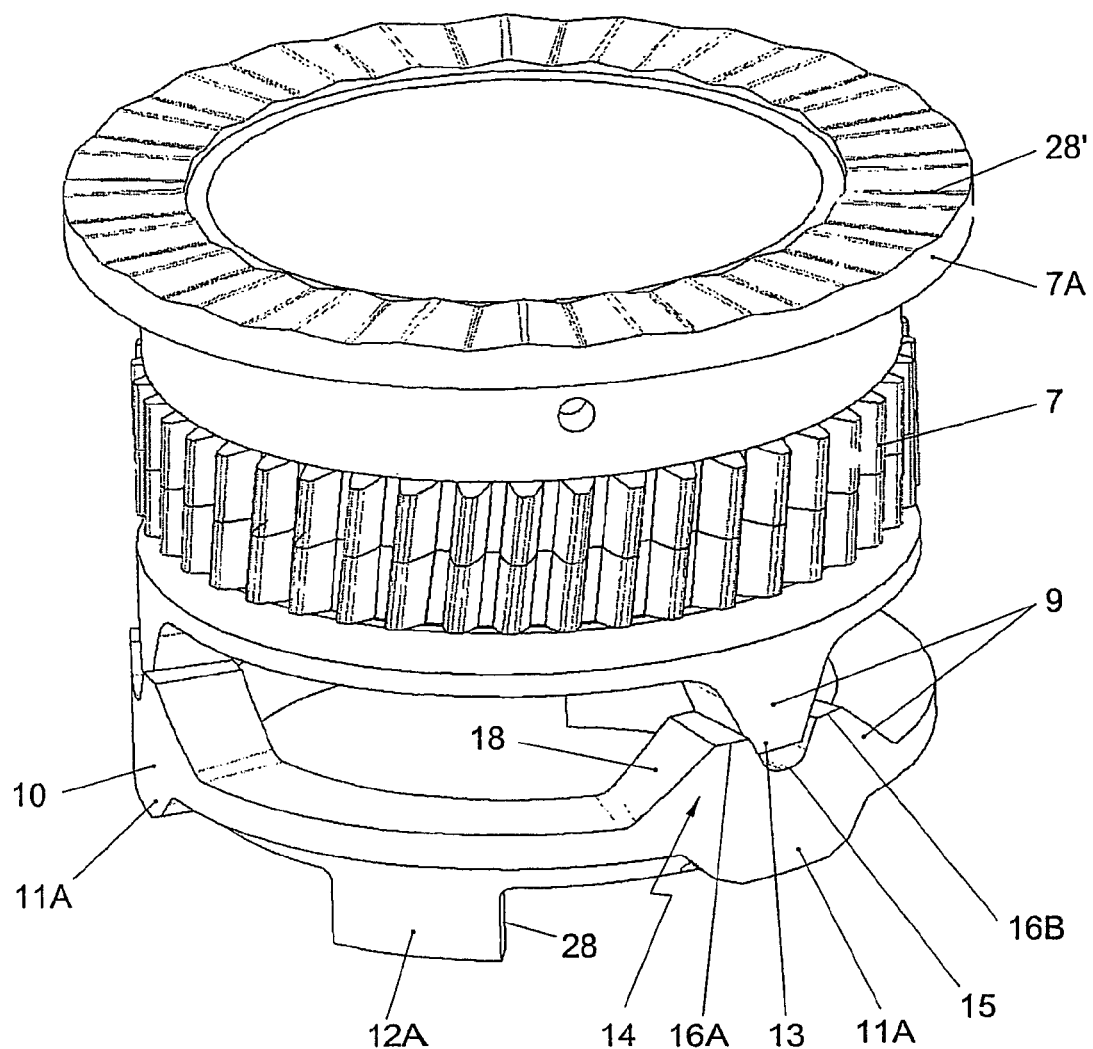
FIG. 3 shows a detail of the hinge actuator of FIG. 1 in which a gear wheel is shown which cooperates via coupling means with a coupling ring.

Referring to FIG. 3, the coupling means 9 elegantly comprise at least one or more noses 13 each cooperating with a cam track 14 with a two-topped profile, such that in the folded-out position the nose 13 is received in the valley 15 between the tops 16a, 16b. In coupled condition of gear wheel 7 and coupling ring 10, the nose 13 is secured in the valley 15 like a camel driver between the humps of his camel, so that a clearly sensible 'click' can be sensed when the mirror support 4 is adjusted manually into or out of the coupled condition.

In uncoupled condition, the nose 13, and hence the gear wheel 7, come to lie nearer to the base plate 2. As a result, the flange edge 7A of the gear wheel 7 comes into contact with a ring-shaped part 4A of the surface of the mirror support 4. Through this contact, during manual adjustment, the spring force is transmitted from the flange edge 7A of the gear wheel via the mirror support 4 to the base plate 2. Because the mirror support is pressed onto the base plate in this way, it can be properly felt by hand, when during manual adjustment the folded-out position is reached, that the stops 5A, 5B of mirror support and base plate cooperate.

What can be achieved by giving the mutually facing flanks 17 of the tops of the two-topped profile a steeper slope than the flanks 18 facing away from each other, is that the nose 13 after uncoupling can be returned back into the valley 15 with the aid of the drive, while avoiding the possibility of the nose being removed from the valley under the action of the drive.

In case of a non-electrically driven pivotal motion, the nose 13 will be lifted out of the valley 15, against the action of the spring 6, and pass one of the tops 16a, 16b. The gear wheel 7 can then rotate about the base shaft 3 without the coupling ring 10 limiting the pivotal motion.

In the exemplary embodiment shown, there is a friction plate 28 which cooperates under spring action with a corresponding friction plate 29 included around the central shaft 3, restrained from rotation. In this way, it can be ensured that the coupling ring 10 will rotate later about the central shaft 3 than the mirror support 4.

The coupling between gear wheel and coupling ring can subsequently be reestablished by means of the drive. Through cooperation with the output part of the drive, the gear wheel 7 will pivot about the base shaft 3, and the nose 13, from the situation shown in FIG. 5C, will pass via the relatively gentle slope of an outermost tooth flank 18 over a top 16 of the two-topped profile After passing the top 16, the nose 13 will be received in the valley 15 between the tops 16 and assume a position shown in FIG. 3. Since the mutually facing tooth flanks 17 are too steep for the nose 13 to be removed from the valley under the action of the drive, the coupling ring 10 will subsequently be carried along by the gear wheel 7, after which the coupling ring runs on to the end of its free travel.

It will be clear that the invention is not limited to the exemplary embodiment represented here, but that many variants are possible within the scope of the invention as set forth in the following claims.

The invention claimed is:

1. A hinge actuator for a wing mirror unit, comprising:
a base plate for mounting on a motor vehicle, the base plate including a base shaft having a mirror support that is pivotally arranged around the base shaft, the base plate and mirror support further including cooperating stops for defining a folded-out position of the mirror support relative to the base plate;
an output part of a drive arranged on the mirror support;
a coupling ring rotatably disposed circumferentially around the base shaft so as to be axially movable under a spring action; and
a gear wheel affanged around the base shaft so as to be rotatable and axially movable under the spring action, the gear wheel cooperates with the output part of the drive on the mirror support, and further cooperates via coupling element with the coupling ring;
wherein the coupling ring is a separate component from the base plate and the gear wheel, and the coupling ring is arranged so as to be rotatable with limited travel about the base of the shaft between a first angle α1, which corresponds to the folded-out position, and a second angle α2, and further wherein the coupling ring can cooperate with the mirror support via a first set of cooperating stops, and can cooperate with the base plate via a second set of cooperating stops, such that in the first angle α1 of the coupling ring, the spring force is transmitted, through cooperation of the first set of stops, via the mirror support to the base plate, and that in the second angle α2 of the coupling ring, the spring force, through cooperation of the second set of stops, while leaving the mirror support clear, is transmitted to the base plate.

2. The hinge actuator according to claim 1, wherein the spring action on the coupling ring is greater when the coupling ring is positioned at the first angle α1 than when the coupling ring is positioned at the second angle α2.

3. The hinge actuator according to claim 1, wherein the coupling ring comprises a nose configured to cooperate with a cam track.

4. The hinge actuator according to claim 3, wherein the cam track includes a two-topped profile defining a valley.

5. The hinge actuator according to claim 4, wherein the nose is received in the valley when the mirror support is in the folded-out position relative to the base plate.

6. The hinge actuator according to claim 4, wherein the two-topped profile comprises first and second tops.

7. The hinge actuator according to claim 6, wherein mutually facing flanks of the first and second tops have a steeper slope than the flanks of the first and second tops facing away from each other.

8. The hinge actuator according to claim 1, wherein the mirror support may be pivoted electrically or manually.

9. The hinge actuator according to claim 1, wherein the cooperating stops of the base plate and mirror support comprise a plurality of cams on the mirror support and a plurality of recesses on the base plate, the plurality of recesses configured to receive the plurality of cams.

10. The hinge actuator according to claim 1, wherein the difference between the first angle α1 and the second angle α2 is generally between about 10 to 15 degrees.

11. The hinge actuator according to claim 1, wherein the first set of stops comprises a plurality of cams and a plurality of recesses.

12. The hinge actuator according to claim 11, wherein the plurality of cams are regularly spaced along an outwardly situated part of a bottom surface of the coupling ring.

13. The hinge actuator according to claim 11, wherein the plurality of recesses are formed on the mirror support.

14. The hinge actuator according to claim 1, wherein the second set of stops comprises a plurality of cams and a plurality of recesses.

15. The hinge actuator according to claim 14, wherein the plurality of cams are arranged on an inwardly situated part of a bottom surface of the coupling ring.

16. The hinge actuator according to claim 14, wherein the plurality of recesses are formed in a collar on the base plate.

17. The hinge actuator according to claim 14, wherein the plurality of cams extend through a ring-shaped opening in the mirror support.

18. The hinge actuator according to claim 1, further comprising a first friction plate disposed around the base shaft.

19. The hinge actuator according to claim 18, further comprising a second friction plate disposed around the base shaft, the first friction plate configured to cooperate under spring action with the second friction plate.

20. A hinge actuator for a wing mirror unit, comprising:

a base plate for mounting on a motor vehicle, the base plate including a base shaft having a mirror support that is pivotally arranged around the base shaft, the base plate and mirror support further including cooperating stops for defining a folded-out position of the mirror support relative to the base plate;

an output part of a drive arranged on the mirror support;

a coupling ring rotatably disposed circumferentially around the base shaft so as to be axially movable under a spring action, the coupling ring including a nose that is configured to cooperate with a cam track; and a gear wheel arranged around the base shaft so as to be rotatable and axially movable under the spring action, the gear wheel cooperates with the output part of the drive on the mirror support, and further cooperates via coupling element with the coupling ring;

wherein the coupling ring is a separate component from the base plate and the gear wheel, and the coupling ring is arranged so as to be rotatable with limited travel about the base of the shaft between a first angle α1, which corresponds to the folded-out position, and a second angle α2, and further wherein the coupling ring can cooperate with the mirror support via a first set of cooperating stops, and can cooperate with the base plate via a second set of cooperating stops, such that in the first angle α1 of the coupling ring, the spring force is transmitted, through cooperation of the first set of stops, via the mirror support to the base plate, and that in the second angle α2 of the coupling ring, the spring force, through cooperation of the second set of stops, while leaving the mirror support clear, is transmitted to the base plate, and further wherein the actuator provides a sensible audible signal when the mirror support reaches the folded-out position relative to the base plate.

* * * * *

UNITED STATES PATENT AND TRADEMARK OFFICE
CERTIFICATE OF CORRECTION

PATENT NO. : 7,374,299 B2  Page 1 of 1
APPLICATION NO. : 11/500089
DATED : May 20, 2008
INVENTOR(S) : Brouwer et al.

It is certified that error appears in the above-identified patent and that said Letters Patent is hereby corrected as shown below:

In Claim 1, column 6, line 57, "affanged" should be -- arranged --.

Signed and Sealed this

Twenty-ninth Day of July, 2008

JON W. DUDAS
*Director of the United States Patent and Trademark Office*